H. W. FARLEY.

Assignor to C. H. SMITH & J. HEWITT.

Lightning-Rod.

No. 8,635. Reissued Mar. 25, 1879.

Witnesses

D. P. Cowl

L. Bacon

Inventor

Henry W. Farley.

By J. J. Johnston, his attorney.

N. PETERS, PHOTO-LITHOGRAPHER, WASHINGTON, D. C.

UNITED STATES PATENT OFFICE.

HENRY W. FARLEY, OF OSWEGO, ASSIGNOR TO CHARLES H. SMITH AND JOHN HEWITT, OF CHICAGO, ILLINOIS.

IMPROVEMENT IN LIGHTNING-RODS.

Specification forming part of Letters Patent No. 91,530, dated June 22, 1869; Reissue No. 8,459, dated October 22, 1878; Reissue No. 8,635, dated March 25, 1879; application filed January 2, 1879.

*To all whom it may concern:*

Be it known that I, HENRY W. FARLEY, of Oswego, in the county of Kendall and State of Illinois, have invented a certain new and useful Improvement in Lightning-Rods; and I do hereby declare that the following is a full, clear, and exact description thereof, reference being had to the accompanying drawings, and to the letters of reference marked thereon.

In constructing lightning-rods it has been found extremely difficult to produce an article combining the requisite qualities of cheapness, strength, and high conducting power. Those made of copper and other metals of superior conducting power, if made sufficiently strong, are very expensive, and are not therefore in general use, and the demand for them is very limited.

The object of my invention is to produce a lightning-rod possessing the essentials of cheapness, strength, and superior conducting power.

My improvement in lightning-conductors for buildings consists in constructing said conductors of an iron rod, (plain or galvanized,) having flanges longitudinally on a solid core, and in combination therewith a separate strip or strips of sheet-copper, or wires of copper, or other metal having superior conducting qualities, and twisting said core, sheet-metal strip or strips, or wires, so that said flanges form diagonal or spiral grooves around said core, and its axis encircled by said sheet-metal strip or strips, or wires.

To enable others skilled in the art with which my invention is most nearly connected to make and use it, I will proceed to describe its construction and operation.

Figure 1:
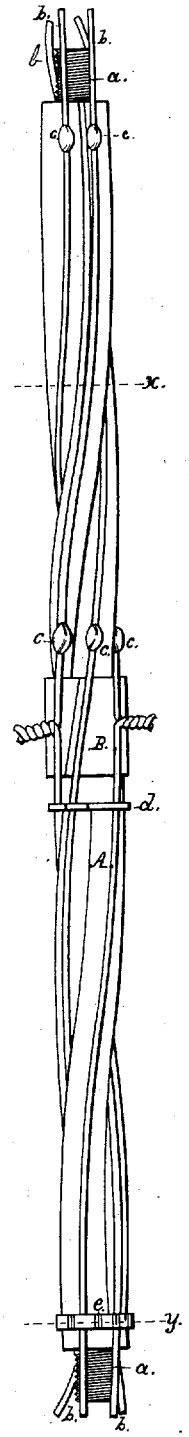
Figure 2:
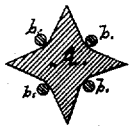
Figure 3:
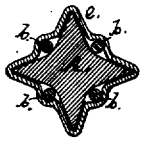

In the accompanying drawings, which form part of my specification, Figure 1 is a side elevation of one form of my improvement in lightning-rods—to wit, the iron core twisted and its axis surrounded with wires of copper. Figs. 2 and 3 are transverse sections of the same at lines *x* and *y* of Fig. 1.

In the accompanying drawings, A represents the iron core of the lightning-rod, made from that form of iron known in commerce as the "star," or "volute," or "angle" pattern—that is to say, a rod of iron having flanges longitudinally on a solid core, and twisted so as to form diagonal or spiral grooves around said core. This form of iron is used for forming the core A, as it combines the maximum of strength with the minimum of weight, and also giving great area of surface. This iron rod for the core A is usually rolled in lengths of about eleven feet, and the ends are provided with screw-threads, as at *a a*, and the sections secured together by a screw-coupling, as at B, for the purpose of forming a continuous rod.

In the construction of the iron core preference is given to the tapering form of flanges, for the reason that said form is adapted to the rolling process, and readily delivered from the grooves in the rolls.

The metal possessing the superior conducting power and used in combination with the iron core A consists of a strip or strips of sheet-copper, or wires of copper, or other metal known to possess a high conducting power.

The copper wires *b b*, which encircle the axis of the iron core A, may be held in position by means of solder, as at *c c c*, or by a wire ring, as at *d*, or by a sheet-metal socket, as at *e*, the latter being made to conform to the contour of the core A, and of such length as may be deemed best by the mechanic.

It will be observed, by reference to Fig. 1, that by the twisted or spiral form of the core A its axis is encircled by the wires *b b*, thereby surrounding the baser metal of the rod with a metal possessing superior qualities as a conductor of electricity.

I have described a single construction of my improvement in lightning-conductors; but the skilled mechanic will readily understand that the core or axis of the iron of the form hereinbefore described may be encircled by a strip or strips of sheet metal having superior qualities for conducting electricity.

The advantages possessed by this construction are so obvious as to scarcely require mention.

It will be seen that the lightning-rod, while strong, durable, and but little more expensive than the ordinary imperfect iron rod so commonly used, combines in its structure the maximum of strength with the minimum of weight, with great area of conducting-surfaces of two distinct metals, one superior to the other as a conductor of electricity, thereby forming a perfect and cheap lightning-rod.

I am aware that star or angle irons have been used for lightning-rods, and I am also aware that copper wire and sheet-copper have been used in combination with iron wire, rods of iron, and also with a bar of iron. Therefore I do not claim, broadly, the combination of copper with iron in the construction of a lightning-rod; but What I do claim as of my invention is—

1. A lightning-rod composed of an iron core having tapering flanges twisted to form spiral grooves around the core, and a strip or strips of sheet-copper encircling the axis of said core, substantially as specified.

2. A lightning-rod constructed of iron having three or more flanges longitudinally on a solid core, said rod being twisted so that the flanges form diagonal or spiral grooves around said core, and in combination therewith a separate strip or strips of sheet-copper or other metal possessing superior qualities for conducting electricity and encircling the axis of said iron rod, substantially as herein described.

3. A lightning-rod constructed of a rod of iron having three or more flanges projecting from a solid core, said rod being twisted so that the flanges form diagonal or spiral grooves around said core, and in combination therewith wires of copper or other metal possessing superior qualities for conducting electricity and encircling the axis of said iron rod, substantially as herein described.

4. A lightning-rod constructed of a rod of iron, galvanized, having three or more flanges projecting from a solid core, said rod being twisted so as to form diagonal or spiral grooves around said core, and in combination therewith wires of copper or other metal possessing superior qualities for conducting electricity and encircling the axis of said iron rod, substantially as herein described.

5. A lightning-rod constructed of an iron rod, galvanized, having three or more flanges longitudinally on a solid core, and twisted so that said flanges form diagonal or spiral grooves around said core, and in combination therewith a separate strip or strips of sheet-copper or other metal possessing superior qualities for conducting electricity encircling the axis of said iron rod, substantially as herein described.

6. A lightning-rod constructed of a rod of iron with flanges longitudinally on a solid core, and in combination therewith a separate metal possessing superior qualities for conducting electricity, and the socket *e*, conforming to the contour of said rod, substantially as herein described, and for the purpose set forth.

HENRY W. FARLEY.

Witnesses:
JAMES J. JOHNSTON,
W. S. COFFMAN.